C. C. COOK.
SUCKER ROD COUPLING.
APPLICATION FILED OCT. 17, 1912.
1,098,018.
Patented May 26, 1914.
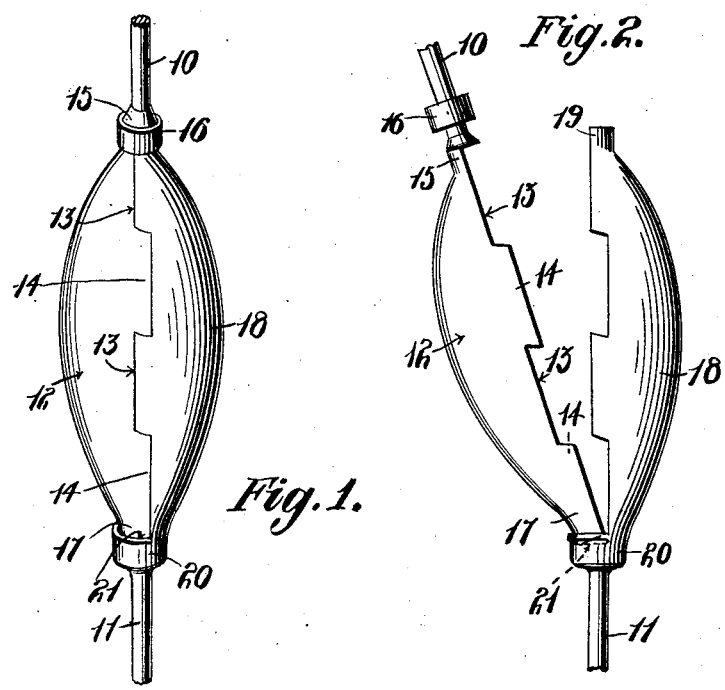
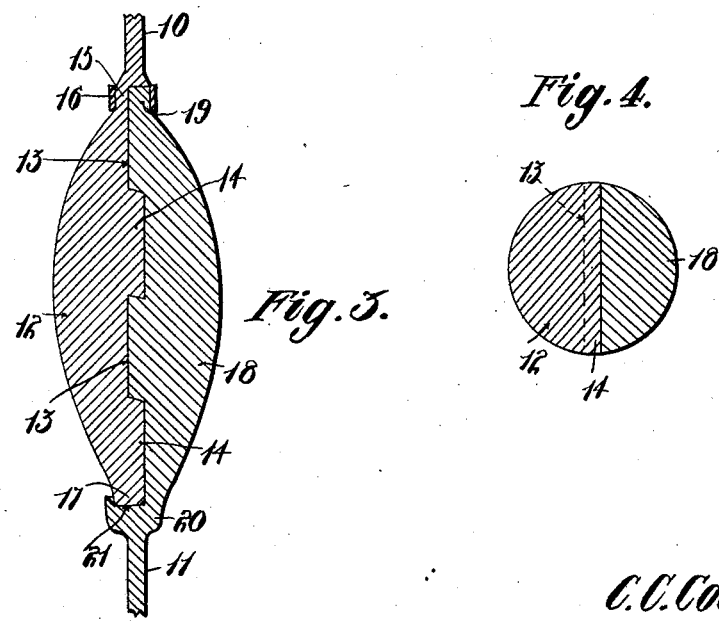
Witnesses
W. C. Fielding
J. P. Bunch
Inventor
C. C. Cook,
By Chandler & Chandler
Attorneys

UNITED STATES PATENT OFFICE.

CLEMENS C. COOK, OF MIDLAND, CALIFORNIA.

SUCKER-ROD COUPLING.

1,098,018.  Specification of Letters Patent.  Patented May 26, 1914.

Application filed October 17, 1912. Serial No. 726,389.

*To all whom it may concern:*

Be it known that I, CLEMENS C. COOK, a citizen of the United States, residing at Midland, in the county of Kern, State of California, have invented certain new and useful Improvements in Sucker-Rod Couplings; and I do hereby declare the following to be a full, clear, and exact description of the invention, such as will enable others skilled in the art to which it appertains to make and use the same.

This invention relates to new and useful improvements in pump or sucker-rods and more particularly to an improved coupling therefor.

The primary object of the invention is to provide a novel and improved coupling adapted to replace the ordinary screw and socket coupling now generally used and to provide for increasing the holding and working efficiency of the rod-coupling.

With the above and other objects in view, the invention resides more particularly in the peculiar combination and arrangement of parts as will be partly illustrated as a preferred embodiment in the accompanying drawings and described in the specification, although the invention is protected for all desirable uses and changes within the scope of the invention as claimed.

Figure 1 is a perspective view of the joint connecting two rod sections. Fig. 2 is an elevation of the parts in the act of connecting or separating the same. Fig. 3 is a vertical sectional view of the parts coupled. Fig. 4 is a cross sectional view.

The preferred embodiment of the invention in coupling rods is shown as embodying a pair of rod sections 10 and 11 respectively, the rod section 10 being formed at one end with a semi-circular enlargement 12 having alternate recesses and projections 13 and 14 respectively and having a reduced upper end portion 15 around which a sleeve 16 is engaged. The lower portion of said enlargement is also reduced in size as shown at 17.

Adapted to coact with the enlargement 12 is an enlargement 18 formed at one end of the rod 11, the same having coacting recesses and projections interlocking therewith and having its upper end formed with a reduced portion 19 around which the sleeve 16 engages to hold the parts from displacement. The lower extremity of the enlargement 18 is enlarged as shown at 20 to provide an extension having a socket 21 receiving the portion 17 before the sleeve is moved to an engaged position and when thus held, displacement or breaking of the sections or spreading thereof is prevented. The manner of connecting the rods also obviates the necessity of turning one rod into the other as in the ordinary screw and socket coupling and thereby permits the use of the larger rod sections with increased durabilty.

I claim:

A sucker-rod coupling including a rod section having a semi-oval enlargement, a second rod section having a semi-oval enlargement, said enlargements having interfitting transverse tongues and grooves on their confronting faces, and coacting in forming an oval body that positions both rod sections in alinement with each other, one of said enlargements having a collar at the lower end formed with a socket in the top face receiving the lower end of the other of said enlargements, said other enlargement having a collar at the upper end forming an abutment for the upper end of the first named enlargement, and a sleeve slidably fitted on the second named rod section and adapted to snugly encircle the last named collar and end of the last named enlargement abutting thereon, whereby to clamp said enlargements together.

In testimony whereof, I affix my signature, in the presence of two witnesses.

CLEMENS C. COOK.

Witnesses:
R. B. WHITTEMORE,
J. W. RAGESDALE.

Copies of this patent may be obtained for five cents each, by addressing the "Commissioner of Patents, Washington, D. C."